Patented Nov. 28, 1944

2,363,819

UNITED STATES PATENT OFFICE 2,363,819

DIPHENYL COMPOUNDS

William H. von Glahn, Loudonville, and Bernard W. Rottschaefer, Albany, N. Y., assignors to General Aniline & Film Corporation, New York, N. Y., a corporation of Delaware No Drawing. Application March 14, 1942, Serial No. 434,787

3 Claims. (Cl. 260—571)

This invention relates to new chemical products hitherto not described in the chemical literature. More particularly it relates to 2-amino-4'-hydroxy diphenyl and its intermediates, namely 2-nitro diphenyl-4'-sulfonic acid and 2-amino-diphenyl-4'-sulfonic acid. All of these compounds are valuable for the manufacture of azo dyestuffs or other purposes such as the manufacture of various intermediates, for example, 2-hydroxy carbazole, new pyrazolones, sulfonamides, ice color bases and sulfanil amides.

We have found that under certain conditions the sulfonation of 2-nitro-diphenyl produces almost exclusively the 2-nitro-diphenyl-4'-sulfonic acid which then can be reduced to the 2-amino diphenyl-4'-sulfonic acid. This compound, when fused with an alkali hydroxide, is converted into 2-amino-4'-hydroxyl diphenyl.

The following examples describing the manufacture of these products are typical of our process:

Example 1.—The preparation of 2-nitro diphenyl-4'-sulfonic acid 2.25 moles of 2-nitro diphenyl (M. W. 199) are mixed with 1125 g. of sulfuric acid of 66° Bé. The mixture is heated to 95–100° C. while stirring well. The temperature of 95–100° C. is maintained until a sample is completely soluble in water. The hot solution is poured onto about 2,000 g. of ice. The charge is then diluted to a total volume of 10 liters and the liquor salted to 15% with sodium chloride. After cooling to 20–25° C. the precipitated sulfonic acid is filtered off, the residue washed with a 15% salt solution. The 2-nitro-diphenyl-4'-sulfonic acid obtained is a light yellow compound which can be purified by recrystallization from water.

Example 2.—The preparation of 2-amino diphenyl-4'-sulfonic acid

The nitro acid obtained in accordance with Example 1 can be reduced according to known methods, for example with iron previously etched with an acid. The resulting 2-amino-diphenyl-4'-sulfonic acid is a white solid, very insoluble in dilute mineral acids and readily soluble in alkalis.

Example 3.—The preparation of 2-amino-4'-hydroxy diphenyl 200 g. of sodium hydroxide 97% and 10 cc. of water are heated to 295–310° C. A stream of nitrogen gas is constantly passed over the surface of the melt. In the course of about 30 minutes 130 g. of dry 2-amino-diphenyl-4'-sulfonic acid are added to the melt. The temperature is then maintained at 295–310° C. for about 45 minutes. The hot mass is poured onto ice and the volume adjusted with water to 1,300 cc. The charge is then made strongly acid with hydrochloric acid, charcoaled at about 70° C. and filtered hot.

The filtrate is carefully neutralized with solid soda ash. The precipitated 2-amino-4'-hydroxy diphenyl is filtered off at 20–25° C. and washed with ice water. It can be purified by recrystallization from water. It is a white solid of a melting point of 164–165° C.

It is manifest that the methods we have described specifically in the examples may be modified considerably without departing from the spirit of the invention. The temperatures given are preferred, but it is obvious in the sulfonation, for instance, the temperature and time of treatment vary with the concentration of the sulfuric acid or oleum used. It is also clear that other alkalies, such as sodamide or potassium hydroxide or mixtures of sodium and potassium hydroxide can be used in the fusion with somewhat different temperatures and time of reaction. We wish it to be understood, therefore, that the scope of our invention is not to be limited to the specific disclosures in the examples.

We claim:

1. 2-amino-4'-hydroxy diphenyl.

2. In the process of preparing 2-amino-4'-hydroxy diphenyl, the step which comprises adding 2-amino diphenyl-4'-sulfonic acid to a hot alkali melt and precipitating the 2-amino-4'-hydroxy diphenyl from the reaction mixture.

3. In the process of preparing 2-amino-4'-hydroxy diphenyl, the steps which comprise adding 2-amino diphenyl-4'-sulfonic acid to a hot alkali melt, chilling the resulting mass, acidifying the same, filtering the reaction mixture, and neutralizing the filtrate to precipitate 2-amino-4'-hydroxy diphenyl.

WILLIAM H. VON GLAHN.
BERNARD W. ROTTSCHAEFER.